(12) United States Patent
Shiohara

(10) Patent No.: US 9,131,181 B2
(45) Date of Patent: Sep. 8, 2015

(54) APPARATUS AND METHOD FOR PRODUCING A MONOCHROME IMAGE

(75) Inventor: Ryuichi Shiohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 347 days.

(21) Appl. No.: 13/006,304

(22) Filed: Jan. 13, 2011

(65) Prior Publication Data
US 2011/0176156 A1    Jul. 21, 2011

(30) Foreign Application Priority Data

Jan. 15, 2010    (JP) .................................. 2010-006966

(51) Int. Cl.
*G06F 15/00* (2006.01)
*H04N 1/40* (2006.01)

(52) U.S. Cl.
CPC ................................ *H04N 1/40012* (2013.01)

(58) Field of Classification Search
CPC .... H04N 1/6027; H04N 1/40012; H04N 1/60
USPC ........... 358/1.9, 501, 512, 515; 382/162, 163, 382/274
See application file for complete search history.

(56) References Cited

U.S. PATENT DOCUMENTS

| | | | | |
|---|---|---|---|---|
| 4,876,590 | A  * | 10/1989 | Parulski | 348/281 |
| 7,283,683 | B1 * | 10/2007 | Nakamura et al. | 382/274 |
| 2004/0227977 | A1 * | 11/2004 | Yoshida | 358/3.01 |
| 2005/0206775 | A1 * | 9/2005 | Shiohara | 348/360 |
| 2005/0286085 | A1 * | 12/2005 | Lee | 358/3.26 |
| 2006/0164673 | A1 * | 7/2006 | Horii | 358/1.13 |
| 2007/0177031 | A1 | 8/2007 | Fujiki et al. | |

FOREIGN PATENT DOCUMENTS

| | | |
|---|---|---|
| JP | 2005-260504 A | 9/2005 |
| JP | 2007-206107 A | 8/2007 |
| JP | 2009-232343 A | 10/2009 |

* cited by examiner

*Primary Examiner* — Jamares Q Washington
(74) *Attorney, Agent, or Firm* — Kilpatrick Townsend & Stockton LLP

(57) ABSTRACT

A method to configure an apparatus to apply a plurality of mono colorization filters to a low resolution version of a color image. A contrast value is determined for each application of the mono colorization filters. The mono colorization filter achieving the highest contrast value is applied to a high resolution version of the color image to produce a high contrast monochrome image. The high contrast monochrome image is then printed by the apparatus.

21 Claims, 3 Drawing Sheets

FIG. 3

| | CALCULATING METHOD OF THE MIXING PROCESS OF RGB | EFFECT |
|---|---|---|
| STANDARD FILTER | $Y = 0.30 \times R + 0.59 \times G + 0.11 \times B$ | USUAL MONOCHROME DENSITY CONVERSION |
| GREEN FILTER | $Y = -0.10 \times R + 1.20 \times G - 0.10 \times B$ | RED COLOR OR MAGENTA BECOMES DARKER, GREEN COLOR BECOMES LIGHTER. |
| RED FILTER | $Y = 0.70 \times R + 0.50 \times G - 0.20 \times B$ | BLUE COLOR OR CYAN BECOMES DARKER, RED COLOR BECOMES LIGHTER. |
| BLUE FILTER | $Y = -0.10 \times R + 0.50 \times G + 0.60 \times B$ | RED OR YELLOW COLOR BECOMES DARKER, BLUE COLOR OR CYAN BECOMES LIGHTER. |
| YELLOW FILTER | $Y = 0.52 \times R + 0.92 \times G - 0.44 \times B$ | YELLOW COLOR BECOMES DARKER, RED OR GREEN COLOR BECOMES LIGHTER, CYAN OR MAGENTA BECOMES SLIGHTLY DARKER. |
| ORANGE FILTER | $Y = 0.60 \times R + 0.50 \times G - 0.10 \times B$ | CYAN, GREEN OR BLUE COLOR BECOMES DARKER, RED COLOR BECOMES LIGHTER. |

APPARATUS AND METHOD FOR PRODUCING A MONOCHROME IMAGE

CROSS REFERENCES TO RELATED APPLICATIONS

This application claims priority to Japanese Patent Application No. 2010-006966 filed in the Japanese Patent Office on Jan. 15, 2010, the entire contents of which are incorporated herein by reference.

BACKGROUND

The present invention relates to a print controlling apparatus that controls a printing unit that performs printing of an image, and a monochrome image producing method.

A monochrome image can be generated by an apparatus having only one color component, such as Y and the like, in one pixel by weighting and adding the gradation value of each color with regard to each pixel in a color image having multiple color components, such as RGB and the like, in one pixel, taken by a digital camera (for example, refers to JP-A-2005-260504). This apparatus displays on the display each item of a green filter, a yellow filter, an orange filter, a red filter, and no filter to receive the selection of a filter to be used, and converts a color image to a monochrome image by the weighting that corresponds to the selected filter.

In the aforementioned apparatus, the user arbitrarily selects the filter to convert the color image to a monochrome image, thereby putting an excessive burden on the user.

SUMMARY

An advantage of some aspects of the invention is to convert a color image to a monochrome image having a certain contrast density and then print the monochrome image without placing a burden on the user.

According to a first aspect of the invention, there is provided a print controlling apparatus that controls a printing unit that performs the printing of an image including a color image obtaining unit that obtains a color image that expresses the image with multiple colors; a first monochrome image generating unit that generates a plurality of monochrome images for preprocessing which is monocolored by applying a plurality of mutually different calculations based on the obtained color image; a contrast calculating unit that calculates the contrast of the generated plurality of monochrome images for preprocessing; and a print controlling unit that controls the printing unit to perform printing based on the monochrome image for printing which is generated by applying to the obtained color image the calculation used to generate the monochrome image for preprocessing for which the calculated contrast satisfies a predetermined condition.

The print controlling apparatus according to the invention obtains a color image, generates a plurality of monochrome images for preprocessing which is monocolored by applying a plurality of mutually different calculations based on the obtained color image, calculates the contrast of the generated plurality of monochrome images for preprocessing, and controls the printing unit to perform printing based on the monochrome image for printing which is generated by applying to the obtained color image the calculation used to generate the monochrome image for preprocessing for which the calculated contrast satisfies a predetermined condition. Thereby, it is possible to more appropriately convert a color image to a monochrome image and then print the monochrome image without a burden on a user.

In the print controlling apparatus according to the invention, the print controlling unit may controls the printing unit to perform printing based on the monochrome image for printing which is generated by applying to the obtained color image the calculation used to generate the monochrome image for preprocessing with the strongest calculated contrast.

In the print controlling apparatus according to the invention, the first monochrome image generating unit is a unit that generates a monochrome image for preprocessing with a first resolution, and the print controlling unit may include a second monochrome image generating unit that generates a monochrome image for printing with a second resolution that is higher than the first resolution by applying to the obtained color image the calculation used to generate the monochrome image for preprocessing for which the calculated contrast satisfies a predetermined condition. Thereby, it is possible to further reduce the process burden when generating the monochrome image for preprocessing and save the capacity that stores the monochrome images for preprocessing.

In the print controlling apparatus according to the invention, a plurality of calculations may include two or more of filters from a standard filter, a green filter that makes green colors have a lighter color than the standard filter, a red filter that makes red colors have a lighter color than the standard filter, a blue filter that makes blue colors have a lighter color than the standard filter, a yellow filter that makes yellow colors have a lighter color than the standard filter, and an orange filter that makes orange colors have a lighter color than the standard filter.

According to a second aspect of the invention, there is provided machine readable instructions for causing a computer to be configured as any of the aforementioned print controlling apparatuses disclosed herein. The instructions may be recorded on a tangible computer-readable recording medium (for example, hard disk, ROM, FD, CD, DVD and the like), in a permanent or temporary manner (e.g., RAM, processing cache, register memory, etc.). Executing these instructions on a computer can obtain a similar result to the aforementioned print controlling apparatus.

According to a third aspect of the invention, there is provided a monochrome image producing method that produces a monochrome image from a color image including (a) obtaining a color image that expresses an image with multiple colors; (b) generating a plurality of monochrome images for preprocessing which is monocolored by applying a plurality of mutually different calculations based on the obtained color image; (c) calculating the contrast of the generated plurality of monochrome images for preprocessing; and (d) generating a monochrome image by applying to the obtained color image the calculation used to generate the monochrome image for preprocessing for which the calculated contrast satisfies a predetermined condition.

The monochrome image producing method according to the invention obtains a color image, generates a plurality of monochrome images for preprocessing which is monocolored by applying a plurality of mutually different calculations based on the obtained color image, calculates the contrast of the generated plurality of monochrome images for preprocessing, and generates a monochrome image by applying to the obtained color image the calculation used to generate the monochrome image for preprocessing for which the calculated contrast satisfies a predetermined condition. Thereby, it is possible to more appropriately convert a color image to a monochrome image and then print the monochrome image without a burden on a user. Any of the methods disclosed herein can be configured as machine readable instructions recorded on a tangible machine readable medium in a permanent or temporary manner (e.g., RAM, processing cache, register memory, etc.)

BRIEF DESCRIPTION OF THE DRAWINGS

The invention will be described with reference to the accompanying drawings.

FIG. 3 is a reference chart showing examples of mono colorization filters.

DESCRIPTION OF EXEMPLARY EMBODIMENTS

Figure 1:
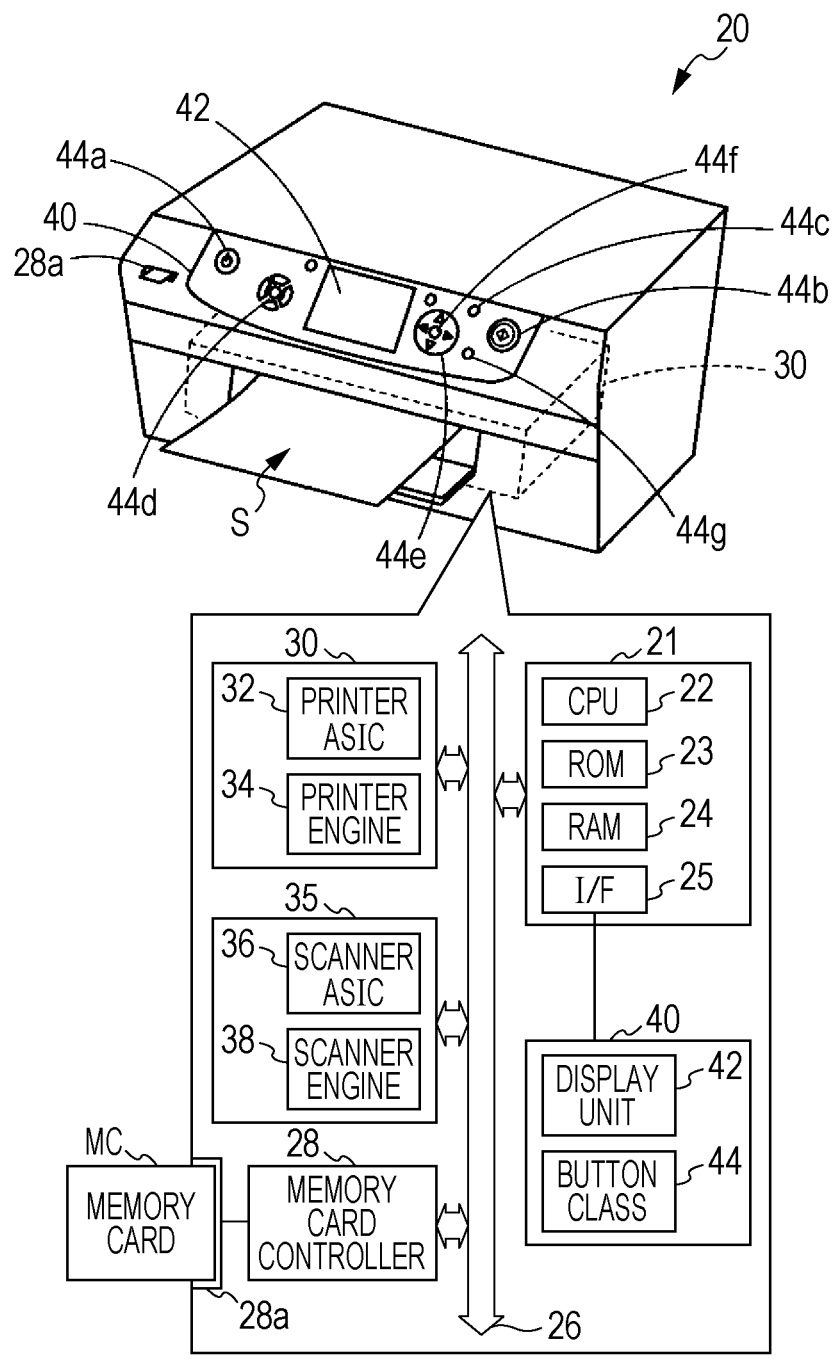
FIG. 1 is a schematic diagram of a multifunction printer according to the present embodiment.

FIG. 1 is a configuration diagram showing the outline of the configuration of a multifunction printer 20 that is an embodiment of the invention. The multifunction printer 20 according to the embodiment includes a printer unit 30 that performs printing by ejecting ink as a colorant onto a recording paper S; a scanner unit 35 that generates image data by optically reading a document placed on the platen; a memory card controller 28 which is in charge of data input and output with respect to a memory card MC inserted in a memory card slot 28a; an operating panel 40 where a user can perform a variety of operations; and a main controller 21 which is in charge of the control of the entire apparatus.

The printer unit 30 includes a printer ASIC 32 and a printer engine 34. The printer ASIC 32 is an integrated circuit that controls the printer engine 34, and, when receiving a printing command from the main controller 21, controls the printer engine 34 to print an image on the recording paper S based on an image file that is the target of the printing command. The printer engine 34 is configured using a well-known ink jet type color printer mechanism that performs printing by ejecting ink onto a sheet of paper from the printing head. Here, ASIC is an abbreviation of Application Specific Integrated Circuit.

The scanner unit 35 includes a scanner ASIC 36 and a scanner engine 38. The scanner ASIC 36 is an integration circuit that controls the scanner engine 38, and when receiving a scanning command from the main controller 21, controls the scanner engine 38 to read a document placed on the platen as image data. In addition, the scanner engine 38 is configured using a well-known image scanner, and includes a well-known color image sensor that emits light toward the document and separates the reflected light into each of the colors red (R), green (G), and blue (B) so as to generate scan data.

The memory card controller 28 is a unit that performs the input and output of data with respect to the memory card MC inserted in the memory card slot 28a arranged next to the operating panel 40. The memory card controller 28 reads a file stored in the memory card MC and transfers it to the main controller 21 when the memory card MC is inserted in the memory card slot 28a, or writes data on the memory card MC on the basis of commands inputted from the main controller 21.

The operating panel 40 includes a display unit 42 and buttons 44. The display unit 42 is a liquid crystal display and displays a variety of operating screens and the like that perform the selection or setting of menus. In addition, the buttons 44 includes a power supply button 44a for turning the power supply on and off; a start button 44b that commands the start of printing or copying; a setting button 44c for performing a variety of printing setting or copying setting; a mode selection button 44d that selects a variety of modes; up/down and left/right arrow keys 44e for selecting a variety of items or settings; an OK button 44f for applying the selected settings; and a return button 44g that returns to the previous screen. The buttons 44 are set so that a user's instruction can be inputted to the main controller 21 via an internal communication interface 25. Here, examples of the modes that can be selected by the mode selection button 44d include a copy mode that scans and copies a document placed on the platen; a memory card mode that prints an image being stored in the memory card MC or scans a document to generate data and then stores the data in the memory card MC; and a film mode that scans and prints a photo file or stores data in the memory card MC.

The main controller 21 is configured as a micro processor having a CPU 22, and includes a ROM 23 that stores a variety of processing programs, data, tables, and the like; a RAM 24 that temporarily stores scan data or print data; and the internal communication interface 25 that enables communication with the operating panel 40, all of which are connected one another to enable the exchange of signals via a bus 26. The main controller 21 inputs a variety of action signals and detecting signals from the printer unit 30, the scanner unit 35, and the memory card unit 28 or inputs operating signals generated according to the operations on the buttons 44 in the operating panel 40. In addition, the main controller 21 outputs the memory card controller 28 a command to read an image file from the memory card MC and then output it to the main controller 21, outputs a command to the printer unit 30 to perform the printing of image data, outputs a command to the scanner unit 35 to read a document placed on the platen as image data based on a scanning command from the buttons 44 in the operating panel 40, and outputs the controlling command of the display unit 42 to the operating panel 40.

Next, the operation of the multifunction printer 20 according to the embodiment configured in this manner, particularly the operation when converting and printing a monochrome image from a color image will be described.

Figure 2:
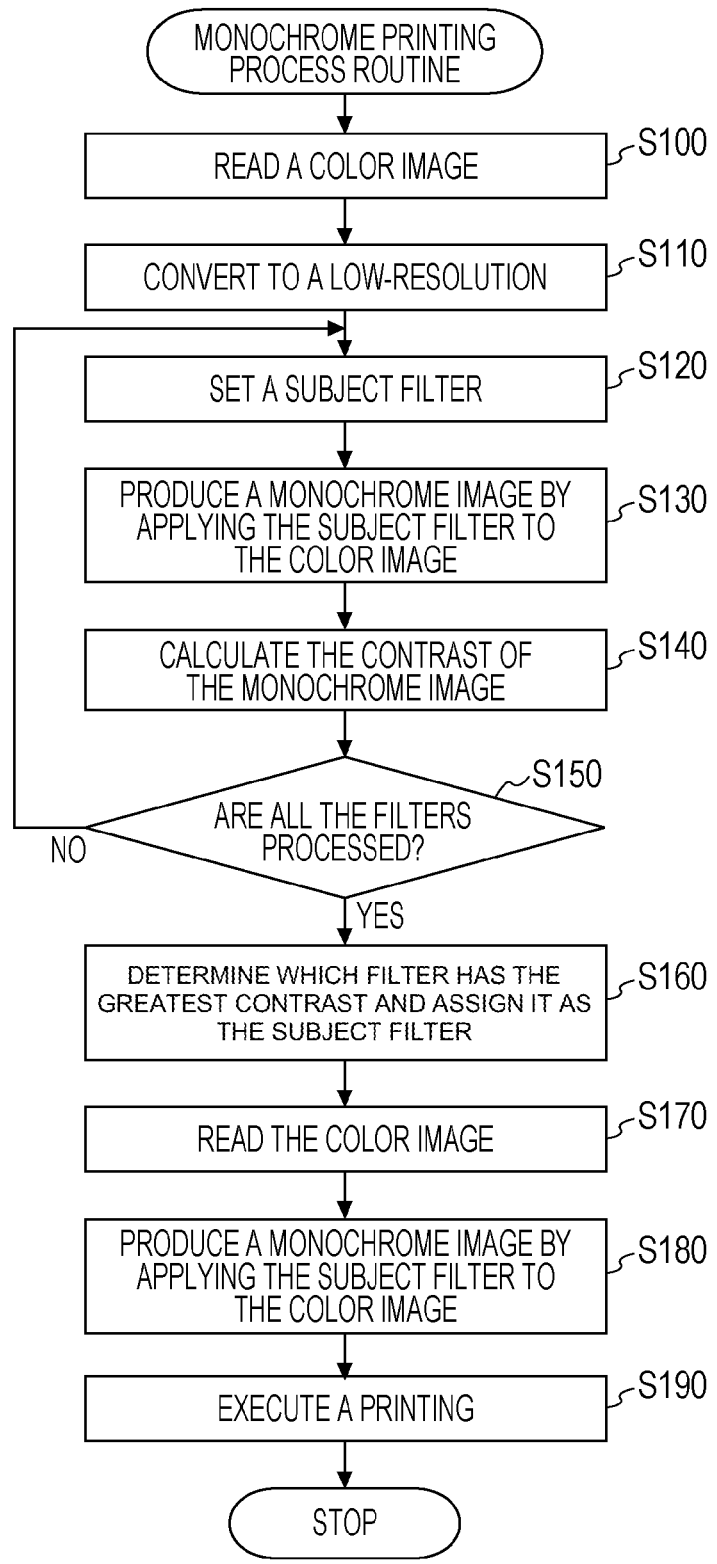
FIG. 2 is a flowchart showing an example of a monochrome printing process routine.

FIG. 2 is a flowchart showing an example of a monochrome printing process routine executed by the main controller 21. This process is executed, for example, when the memory card mode is selected using the mode selection button 44d and then there is a command for printing an image file selected from the image files held in the memory card MC using the operation of the arrow keys 44e and the OK button 44f on a photo selection screen (not shown) in a state in which monochrome printing is designated using the setting button 44c. It is also possible to perform the following processes in the other modes, such as a copy mode that prints image data that the scanner unit 35 has read from the document by a scanning operation.

When the monochrome printing process routine is executed, the CPU 22 in the main controller 21, first of all, reads the selected color image (RGB data) from the memory card MC (Step S100). At this time, if the color image uses another color space, such as JPEG and the like, the CPU 22 converts the color space to RGB data after reading the image. Then, the color image is converted to a low resolution by, for example, taking out pixels at regular intervals (Step S110). Next, out of a plurality of mono colorization filters available to be used, the subject filter of this execution is automatically set (Step S120) and then applied to the resolution converted color image so as to generate a monocolored monochrome image (Step S130). FIG. 3 shows an example of the mono colorization filter. In the embodiment, as the mono colorization filter, as shown in the drawing, a standard filter that performs a standard monochrome density conversion, a green filter that makes red or magenta have a darker color and green have a lighter color than the standard filter, a red filter that makes blue or cyan have a darker color and red have a lighter color than the standard filter, a blue filter that makes red or yellow have a darker color and blue or cyan have a lighter color than the standard filter, a yellow filter that makes cyan or magenta have a slightly darker color and yellow, red, or green have a lighter color, and an orange filter that makes cyan, green, or blue have a darker color and red have a lighter color are prepared. The production of a monochrome image in the embodiment is performed by weighing the respective gradation values of red R, green G, and blue B in the color image with the weighting coefficients r, g and b that correspond to the respective colors of the mono colorization filters and then adding the weighted gradation values.

Once the monochrome images are generated by doing the above, the contrast of the generated monochrome images are calculated, and the contrast values are saved to correspond to the matching used mono colorization filters (Step S140). Then, it is determined whether the process has been completed for all the mono colorization filters (Step S150), and, when there is a mono colorization filter which has not been processed, the process goes back to Step S120 and Steps S130 and S140 are repeated so that the next mono colorization filter is set as the subject filter, a monochrome image is generated and the contrast is calculated, and, when there are no mono colorization filters which have not been processed, the process proceeds to the process of Step S160. Here, the calculation of the contrast of the monochrome images can be obtained by calculating the difference or ratio between the maximum value and the minimum value of the gradation value of each pixel.

Once the monochrome image production and contrast calculation are performed for all the mono colorization filters, out of the prepared plurality of mono colorization filters, the mono colorization filter that generated the monochrome image with the greatest contrast is determined to be the execution filter and, at the same time, the stored contrast values are deleted (Step S160). Then, the selected color image is read (Step S170), a monochrome image is generated by applying the execution filter to the read color image (Step S180), and a printing command is outputted to the printer ASIC 32 to execute the printing based on the generated monochrome image so as to perform the printing at the printer unit 30 (Step S190), thereby completing the present route. Here, the outputting of the printing command may be the transmission of data including the monochrome image generated in Step S180 and the transmission of data generated by processes including additional image processing of, for example, converting the resolution or half-toning of the monochrome image generated in Step S180. As such, when a user performs monochrome printing, since it is possible to automatically generate a monochrome image showing only a small amount of blur and a good contrast from a color image and to print it without designating a particular mono colorization filter, it is possible to reduce the operating burden of the user.

Here, the correspondence relationship between the components of the embodiment and the components of the invention will be made clear. The main controller 21 that executes the process of Step S100 in the monochrome printing process routine in FIG. 2 of the embodiment corresponds to the "color image obtaining unit" of the invention, the main controller 21 that executes the process of Steps S110 to S130 corresponds to the "first monochrome image generating unit", the main controller 21 that executes the processes of Step S140 and S150 corresponds to the "contrast calculating unit", the main controller 21 that executes the processes of Steps S160 to S180 corresponds to the "second monochrome image generating unit", and the main controller 21, the printer ASIC 32, and the printer unit 30 that execute the process of Step S190 correspond to the "outputting unit". Here, in the embodiment, an example of the monochrome image producing method according to the invention has been made clear by describing the operation of the multifunction printer 20.

According to the multifunction printer 20 of the embodiment described in the above, a plurality of monochrome images which is monocolored by respectively applying a plurality of mono colorization filters to the selected color image is generated, the contrast of the generated plurality of monochrome images is calculated. Out of the plurality of mono colorization filters, the mono colorization filter that was used to generate the monochrome image with the strongest contrast is determined as the execution filter and, at the same time, a monochrome image is generated by applying the execution filter to the color image, and printing is performed based on the generated monochrome image, so it is possible to more appropriately convert a color image to a monochrome image and then print the monochrome image without a burden on a user.

In addition, according to the multifunction printer 20 of the embodiment, the production of the monochrome images for calculating the contrast is performed by applying the mono colorization filters to the low-resolution converted image of the read color image, so it is possible to reduce the operating burden and, furthermore, to suppress a decrease in the printing speed.

In the aforementioned embodiment, in addition to the standard filter, a green filter, a red filter, a blue filter, a yellow filter, and an orange filter are prepared, but it is possible to omit a portion of the above filters or to add more mono colorization filters other than the above filters.

In the aforementioned embodiment, the production of the monochrome images for contrast calculation to calculate the contrast is performed by applying the mono colorization filters to the low-resolution converted image of the read color image, but it is possible to directly apply the mono colorization filters to the read color image so as to generate the monochrome image for contrast calculation, and use the monochrome images for contrast calculation generated by using the mono colorization filter determined as the execution filter in the printing.

In the aforementioned embodiment, out of the plurality of mono colorization filters, the monochrome image for printing is generated based on the mono colorization filter that was used to generate the monochrome image with the strongest contrast, but the present invention is not limited thereto, and, out of the plurality of mono colorization filters, for example, a mono colorization filter may be selected which is used to generate the monochrome image for which the contrast is closest to a predetermined appropriate value. In addition, it is possible to select the mono colorization filter in consideration of characteristics other than the contrast.

In the aforementioned embodiment, the invention has been described by applying the multifunction printer 20, but the invention is not limited thereto, and it is possible to apply, for example, a printer having a scanner function or a FAX machine as long as the apparatus converts a color image to a monochrome image and outputs the monochrome image for printing.

In the aforementioned embodiment, the invention has been described in the form of an apparatus performing printing and outputting, but may include a form of a monochrome image producing method for outputting a monochrome image to a printing device by making a computer serve as a print controlling apparatus, such as a printer driver program. In addition, the invention is not limited to an apparatus whose ultimate purpose is printing, but may include an apparatus that stores the monochrome image, or outputs the monochrome image to a storage apparatus or displays the monochrome image, or outputs the monochrome image to a display apparatus.

The invention is not limited to the aforementioned embodiments in any way, and can be carried out in various aspects, such as combinations of the respective embodiments, within the technical scope of the invention.

What is claimed is:

1. An outputting apparatus for outputting an image, the apparatus comprising:
    a color image obtaining unit configured to obtain a color image having multiple colors;
    a first monochrome image generating unit configured to generate a plurality of monochrome images by applying a plurality of mutually different calculations to the color image;
    a contrast calculating unit configured to calculate respective contrasts for the plurality of monochrome images; and
    an outputting unit configured to output a monochrome image derived from the calculated contrasts having the greatest contrast,
    wherein the contrast calculating unit calculates contrast by calculating a gradation value for each pixel of a monochrome image, and wherein the plurality of mutually different calculations include respectively weighing gradation values of red R, green G, and blue B in the color image with respective weighting coefficients, r, g and b to obtain weighting gradation values and then adding the weighting gradation values.

2. The outputting apparatus of claim 1, wherein the first monochrome image generating unit generates the plurality of monochrome images according to a first resolution of the color image; and
    wherein the outputting unit includes a second monochrome image generating unit configured to generate the monochrome image by applying the calculated contrast having the greatest contrast to a second resolution of the color image.

3. The outputting apparatus of claim 1, wherein the monochrome image is outputted for a printing preprocess.

4. The outputting apparatus of claim 1, wherein the plurality of mutually different calculations comprises:
    a standard filter;
    a green filter that makes green colors have a lighter color than the standard filter;
    a red filter that makes red colors have a lighter color than the standard filter,
    a blue filter that makes blue colors have a lighter color than the standard filter,
    a yellow filter that makes yellow colors have a lighter color than the standard filter, and
    an orange filter that makes orange colors have a lighter color than the standard filter.

5. The outputting apparatus of claim 1, wherein the monochrome image is outputted for a printing output process.

6. The outputting apparatus of claim 5, wherein the monochrome image is physically printed by a printing apparatus for the printing output process.

7. A non-transitory machine readable medium that stores instructions which when executed by a processor causes the outputting apparatus of claim 1 to perform a method as configured.

8. A monochrome image producing method that produces a monochrome image from a color image, the method comprising:
    obtaining a color image having multiple colors;
    generating a plurality of monochrome images by applying a plurality of mutually different calculations to the color image;
    calculating respective contrasts for the plurality of monochrome images; and
    outputting, using an outputting unit, a monochrome image derived from the calculated contrasts having the greatest contrast,
    wherein calculating respective contrasts for the plurality of monochrome images comprises calculating a gradation value for each pixel of the plurality of monochrome images, and wherein the plurality of mutually different calculations include respectively weighing gradation values of red R, green G, and blue B in the color image with respective weighting coefficients, r, g and b to obtain weighting gradation values and then adding the weighting gradation values.

9. A non-transitory machine readable medium that stores instructions which when executed by a processor causes the method of claim 8 to perform.

10. A method comprising:
    generating, using a processor, a plurality of monochrome images based on a color image by applying a plurality of mutually different calculations to the color image, the plurality of monochrome images having a plurality of respective contrast values;
    determining, using the processor, which monochrome image has the greatest contrast value; and
    outputting, using the processor, a high contrast monochrome image based on the determination of the greatest contrast value,
    wherein determining, using the processor, which monochrome image has the greatest contrast value comprises calculating a gradation value for each pixel of the plurality of monochrome images, and wherein the plurality of mutually different calculations include respectively weighing gradation values of red R, green G, and blue B in the color image with respective weighting coefficients, r, g and b to obtain weighting gradation values and then adding the weighting gradation values.

11. The method of claim 10, wherein generating the plurality of monochrome images comprises applying a plurality of respective mono colorization filters to the color image.

12. The method of claim 11, wherein the plurality of mono colorization filters includes a standard filter, a green filter, a red filter, a blue filter, a yellow filter, and an orange filter.

13. The method of claim 12, wherein the color image has red, green, and blue gradation values, and wherein the plurality of filters are configured to provide the plurality of respective contrast values by altering the red, green, and blue gradation values in different respective manners.

14. The method of claim 13, wherein each contrast values comprises a summation of altered red, green, and blue gradation values.

15. The method of claim 11, wherein the color image is a low resolution version of a higher resolution version color image.

16. The method of claim 15, wherein the mono colorization filter producing the greatest contrast value is assigned to be a subject filter.

17. The method of claim 16, wherein the subject filter is applied to the original color image to produce the high contrast monochrome image.

18. A non-transitory machine readable medium comprising instructions that when executed by the processor of claim 10, performs the recited method.

19. A printing apparatus comprising the processor and machine readable medium of claim 18, the processor being coupled to a printing unit via a bus.

20. The outputting apparatus of claim 1, wherein the plurality of monochrome images comprise a plurality of low-resolution monochrome images,
   wherein the contrasting calculating unit is further configured to determine which contrast satisfies the predetermined condition and assign the calculation associated with that contrast as a subject filter, and
   wherein the outputting unit is configured to output a high-resolution monochrome image by applying the subject filter to the color image.

21. The outputting apparatus of claim 1, wherein the contrast calculating unit calculates contrast by further determining a difference or ratio between a maximum and minimum gradation value.

* * * * *